June 19, 1923.

T. A. WISEMAN

LOCK

Filed Sept. 9, 1921

1,459,128

4 Sheets-Sheet 3

T.A.Wiseman, Inventor

By C.A.Snow&Co.
Attorney

June 19, 1923.
T. A. WISEMAN
LOCK
Filed Sept. 9, 1921
1,459,128
4 Sheets-Sheet 4
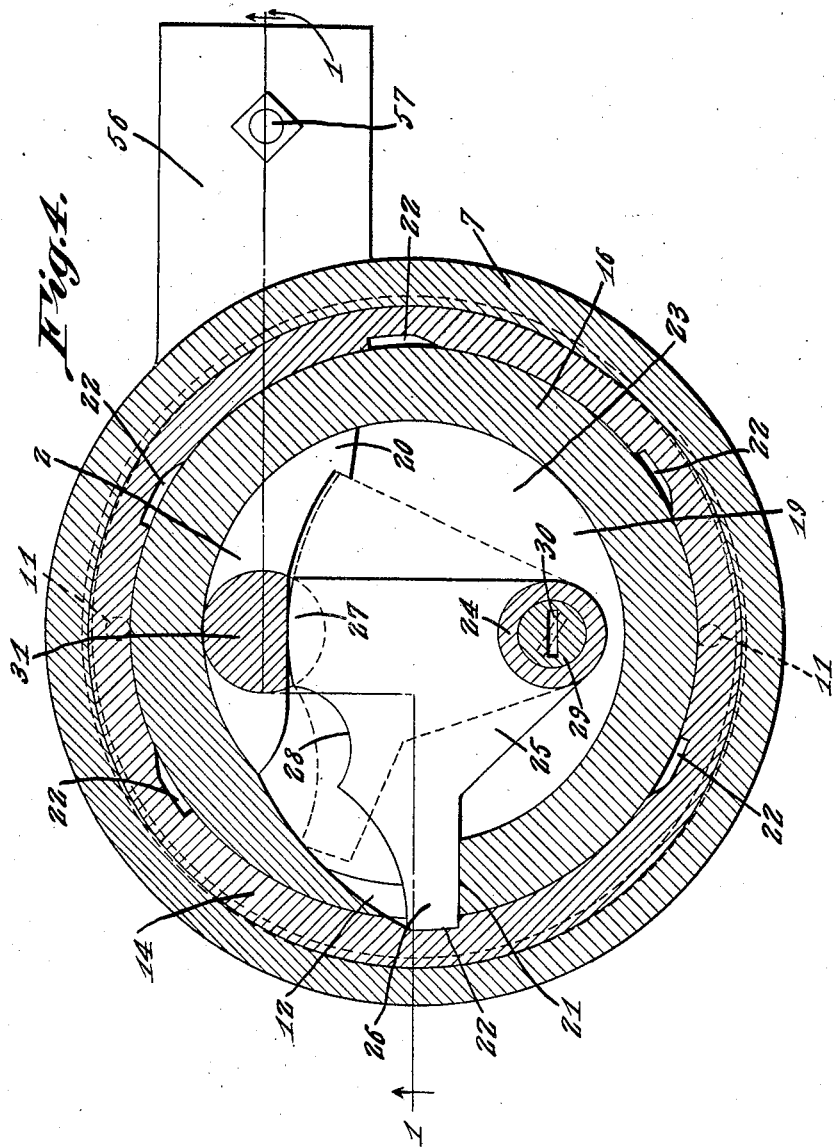
T.A.Wiseman, Inventor
By C.A.Snow & Co.
Attorney Patented June 19, 1923.

1,459,128

UNITED STATES PATENT OFFICE.

THOMAS A. WISEMAN, OF TULLAHOMA, TENNESSEE.

LOCK.

Application filed September 9, 1921. Serial No. 499,377.

*To all whom it may concern:*

Be it known that I, THOMAS A. WISEMAN, a citizen of the United States, residing at Tullahoma, in the county of Coffee and State of Tennessee, have invented a new and useful Lock, of which the following is a specification.

It is the object of this invention to provide a simple means whereby the mechanism of an automobile may be locked, to the end that the automobile may not be at the command of thieves or joy-riders.

It is within the province of the disclosure to improve generally and to enhance the utility of devices of that sort to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1:
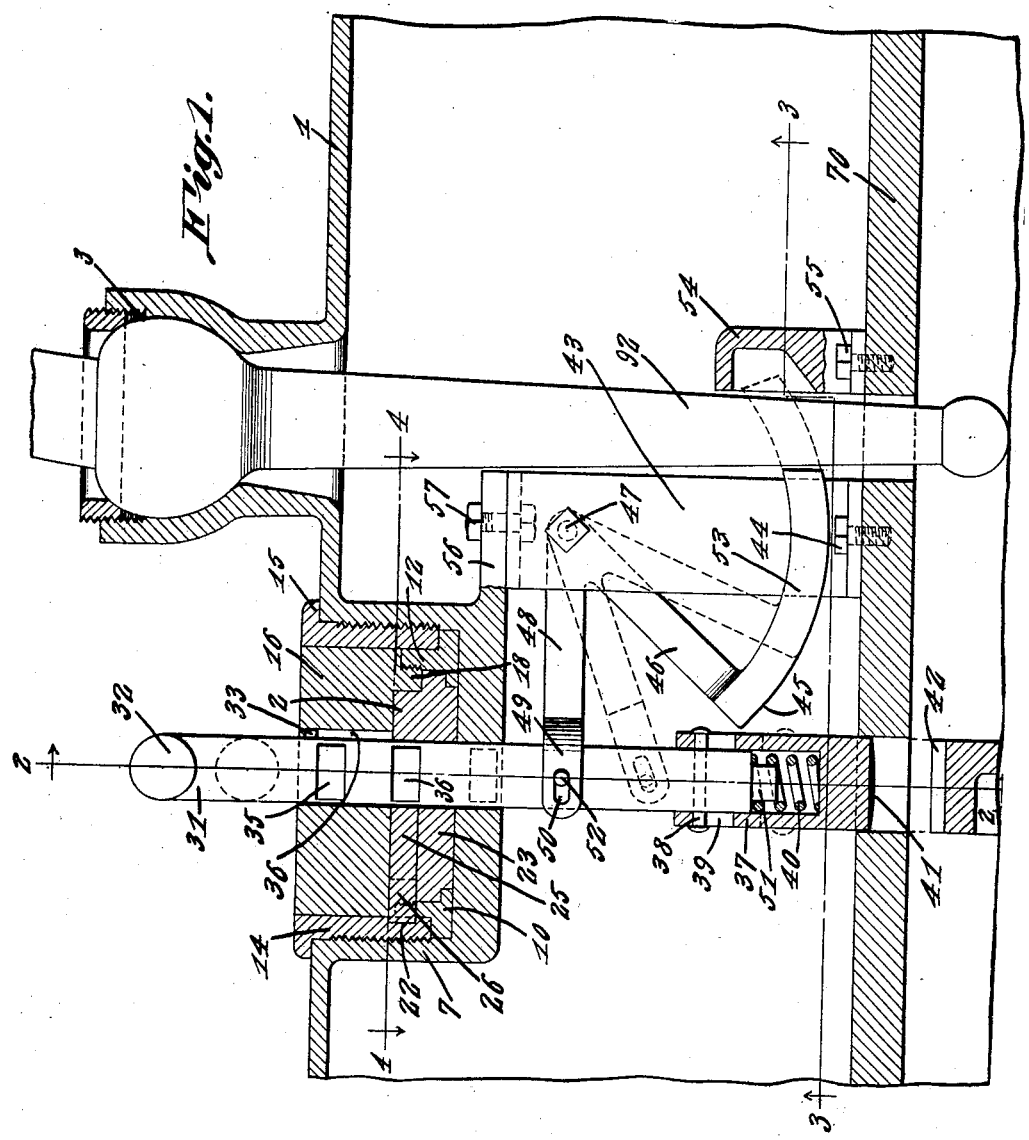
Figure 2:
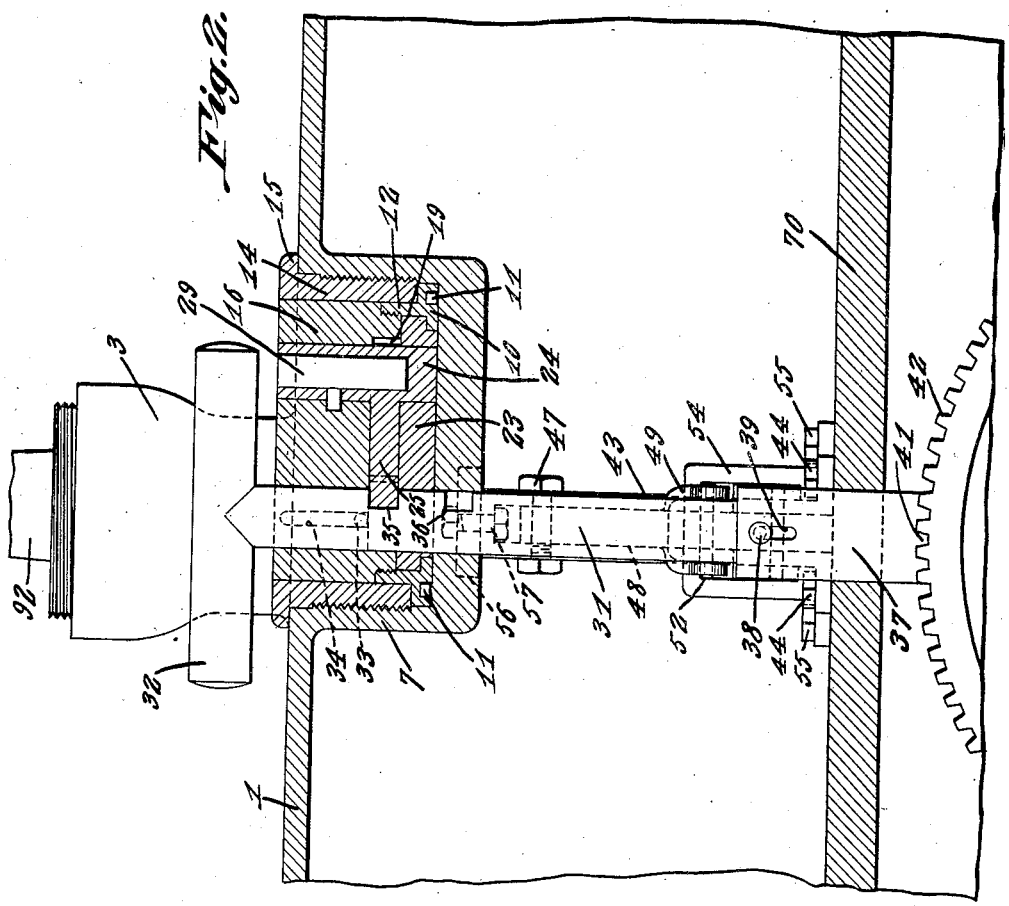
Figure 3:
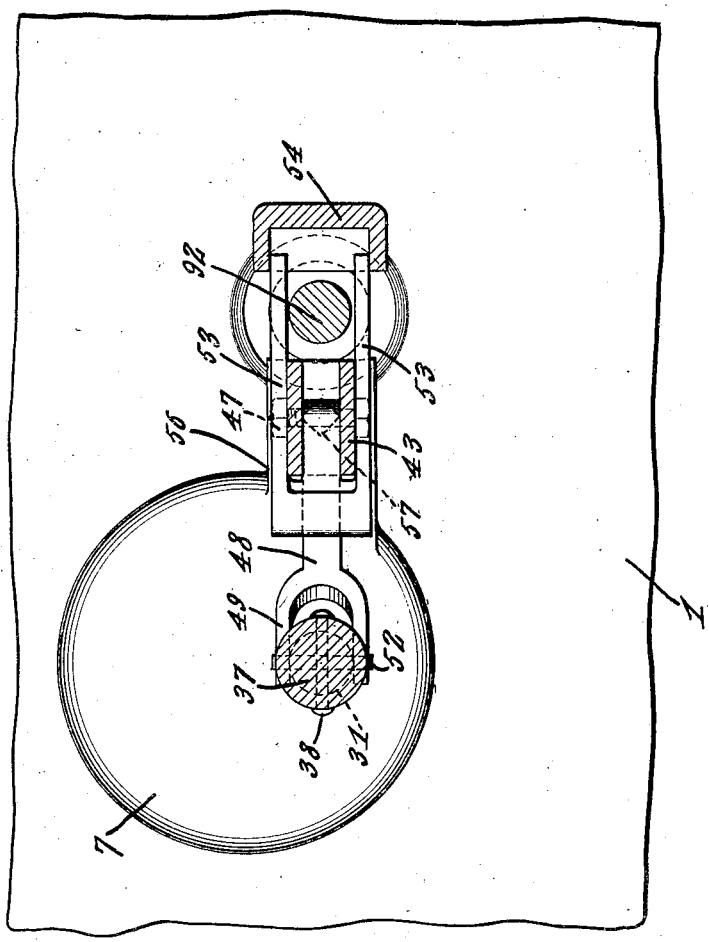

Figure 1 shows in section, a device constructed in accordance with the invention; Figure 2 is a section on the line 2—2 of Figure 1; Figure 3 is a section on the line 3—3 of Figure 1; Figure 4 is a section on the line 4—4 of Figure 1, the line 1—1 in Figure 4 indicating the cutting plane on which Figure 1 is taken.

The device embodies a support of any desired sort, which may be in the form of a transmission casing 1, a portion of the frame for the transmission gearing being denoted by the numeral 70. The gear shift lever is shown at 92 and is mounted at 3 in the usual way. The numeral 7 denotes a socket which may be formed integrally with the casing 1, or be separable therefrom.

A ring 10 is located in the socket 7 and includes an upstanding flange 12. Lugs 11 on the base of the socket 7 are received in the ring 10, and, thus, the ring is held against rotation. A sleeve 14 is located in the socket 7 and is threaded thereto, the sleeve being located outwardly of the flange 12 of the ring 10. The sleeve 14 has a top flange 15 overlapping the casing 1. A block or carrier 16 is located in the sleeve 14 and includes a reduced neck 18 threaded into the flange 12 of the ring 10. In the lower end of the block 16, a chamber 19 is formed. The block 16 has an internal flange 2 projecting into the chamber 19, the flange being provided at one end with a stop 20. An opening 21 is formed in the side wall of the block 16 and communicates with the chamber 19. The sleeve 14 is provided with a plurality of internal seats 22, any one of which may be alined with the opening 21 in the block 16. Since a plurality of the seats 22 is provided, the necessary adjustment of the sleeve in the socket 7 may be secured, the sleeve being threaded into the socket, and it being possible, always, to bring one of the seats 22 into alinement with the opening 21 in the block 16. A disk 23 forms a closure for the lower end of the chamber 19, the disk being located within the ring 10, beneath the block 16.

A shaft 24 is mounted for rocking movement in the block 16 and in the disk 23, the shaft having an arm 25 which is movable in the chamber 19 of the block 16. At one end, or closely adjacent thereto, the arm 25 has a finger 26 movable through the opening 21 into the seat 22. To facilitate the description of the operation of the device, one end portion of the arm 25 has been designated by the numeral 27 in Figure 4. Between the end 27 and the finger 26, the arm 25 has a notch 28 in its edge. Located within the shaft 24 is a key-operated lock 29, which may be of any desired construction, the key hole of the lock being designated by the numeral 30. The function of the lock 29 is to hold the shaft 24 against rotaton with respect to the block or carrier 16.

A bolt 31 is mounted for right line reciprocation in the block 16, in the disk 23, and in the bottom portion of the socket 7, the bolt being sustained by the flange 2, as shown in Figure 4. The bolt 31 is provided at its upper end with a handle 32. The bolt 31 carries a cross pin 33 having limited movement in a slot 34 formed in the block 16, the flange 2 extending across the lower portion of the slot. The bolt 31 is provided with side seats 35 and 36, adapted to receive the arm 25 of the shaft 24. When the pin 33 is at the upper end of the slot 34, the seat 36 will be in a position to receive the arm 25, whereas, when the pin is at the lower end of the slot, the seat 35 will be positioned to receive the arm 25, as shown in Figure 2. A foot 37 of any desired construction is mounted to slide in the frame member 70, and is yieldably carried on the lower end of the bolt 31. The bolt 31 is provided with a securing element 38 having limited movement in slots 39 formed in the foot 37. A compression spring 40 is located within the foot 37 and engages the lower end of the bolt 31, the bolt terminating in a reduced tip 51, received within the spring. At its lower end, the foot 37 is provided with teeth 41 adapted to interlock with the teeth 42 of a gear wheel, or with any other movable part of a vehicle. As will be understood readily the gear wheel 42 may be a part of the transmission, or it may be a special gear wheel applied to any rotating part of the vehicle.

A U-shaped support 43 is provided, and is secured at its lower end, as indicated at 44, to the frame member 70. The socket 7 may have a projecting lip 56 connected by a securing device 57 to the upper end of the support 43. The numeral 45 designates a latch which may be described roughly as being of Z-shape, the latch including a body 46 extended within the support 43 and mounted to swing on a pivot element 47 carried by the support. An arm 48 projects from the body 46 of the latch and terminates in a fork 49 spanning the bolt 31. The fork has slots 50 receiving the ends of a pin 52 mounted in the bolt 31. At the lower end of the body 46 of the latch 45 there are arms 53, between which the support 43 is located. The numeral 54 designates a keeper, secured at 55 to the frame member 70, and adapted to receive the ends of the arms 53 of the latch 45.

Let it be supposed that the lock 29 has been manipulated so that the shaft 24 is set free for rotation with respect to the block 16, the shaft being rotated until the arm 25 abuts against the stop 20, as shown in Figure 4, the notch 28 being alined with the bolt 31, the end 27 of the arm 25 moving out of the seat 36 in the bolt 31. Thereupon, the bolt 31 may be thrust downwardly by means of the handle 32, the teeth 41 on the foot 37 engaging with the teeth 42 of the gear wheel, and holding the gear wheel against rotation. The shaft 24 is then rotated until the end 27 of the arm 25 is received in the seat 35, the bolt 31 being prevented from moving upwardly. The finger 26 is received in the seat 22 of the sleeve 14. The sleeve 14 cannot rotate, and because it cannot rotate, it cannot be threaded out of the socket 7. The sleeve 14, being held, retains the ring 10, and the block 16 cannot be threaded out of the flange 12 of the ring 10, because the block is retained by the part 26 of the arm 25.

When the bolt 31 is thrust downwardly, the latch 45 is tilted on its fulcrum 47, and the arms 53 of the latch, receiving the lower end of the gear shift lever 92, lock the lever, the ends of the arms 53 being received in the keeper 54.

What is claimed is:—

1. In a vehicle lock, the combination with a movable member, of a reciprocatory member under the control of an operator, an approximately Z-shaped latch, one arm of said latch being bifurcated and straddling said reciprocatory member having a pin and slot connection therewith, the other arm of said latch being bifurcated and engaging said movable member, a keeper arranged adjacent said movable member and adapted to be engaged by said last mentioned arm whereby said movable member is locked by said latch on the actuation of said reciprocatory member in one direction.

2. In a vehicle lock, the combination with a movable member, of a reciprocatory bolt under the control of an operator, a Z-shaped latch pivoted between said bolt and movable member with one arm engaged with the bolt, and the other straddling the movable member, a keeper to receive said last mentioned arm whereby the inward movement of the bolt will operate the latch to lock said movable member.

In testimony that I claim the foregoing as my own, I have hereto affixed my signature in the presence of two witnesses.

THOS. A. WISEMAN.

Witnesses:
E. C. MOWRY,
D. H. EVANS.